United States Patent
Pick et al.

(10) Patent No.: US 7,273,127 B2
(45) Date of Patent: Sep. 25, 2007

(54) RACK FORCE DISTURBANCE REJECTION

(75) Inventors: Andrew James Pick, Herts (GB); Timothy James Sworn, Birmingham (GB); Andrew Dennis Barton, Coventry (GB); James Owen Patrick Farrelly, Kenilworth (GB)

(73) Assignee: TRW Limited (GB)

( * ) Notice: Subject to any disclaimer, the term of this patent is extended or adjusted under 35 U.S.C. 154(b) by 0 days.

(21) Appl. No.: 11/245,935

(22) Filed: Oct. 7, 2005

(65) Prior Publication Data

US 2006/0106516 A1    May 18, 2006

Related U.S. Application Data

(63) Continuation of application No. PCT/GB04/01356, filed on Mar. 31, 2004.

(30) Foreign Application Priority Data

Apr. 9, 2003    (GB) ................................. 0308133.8

(51) Int. Cl.
*B62D 6/04*    (2006.01)
(52) U.S. Cl. ........................................ 180/446; 701/42
(58) Field of Classification Search ................ 180/443, 180/446; 701/41, 42
See application file for complete search history.

(56) References Cited

U.S. PATENT DOCUMENTS

| | | | |
|---|---|---|---|
| 5,828,972 A | 10/1998 | Asanuma et al. | |
| 5,845,222 A | 12/1998 | Yamamoto et al. | |
| 6,330,496 B1 | 12/2001 | Latarnik et al. | |
| 6,954,691 B2 * | 10/2005 | Roll et al. | 701/70 |
| 2001/0041957 A1 | 11/2001 | McCann et al. | |
| 2003/0055545 A1 | 3/2003 | Uenuma et al. | |
| 2003/0191572 A1 | 10/2003 | Roll et al. | |

FOREIGN PATENT DOCUMENTS

| | | |
|---|---|---|
| EP | 1 215 103 | 6/2002 |
| EP | 1 234 746 | 8/2002 |
| FR | 2 801 270 | 5/2001 |
| WO | 01/81139 | 11/2001 |
| WO | 02/062647 | 8/2002 |

* cited by examiner

*Primary Examiner*—Kevin Hurley
(74) *Attorney, Agent, or Firm*—MacMillan, Sobanski & Todd, LLC

(57) ABSTRACT

A road vehicle steering system which is adapted to use measurements and estimates characterising the motion of and forces acting on the vehicle and the steering system such as to derive an estimate of steering system disturbance force and to then use the latter estimate to establish a torque demand for the vehicle electronic power steering (EPS) which substantially compensates for this disturbance force.

8 Claims, 3 Drawing Sheets

FIG.1.

Vehicle, Drive-line, Steering and Braking System Measurements → Steering Rack Disturbance Force Estimation → Disturbance Rejection Torque Demand → Disturbance Rejection Torque Demand

FIG.2.

Engine Torque, Gear Ratio, Brake Pressure, Wheel Angular Velocity → Steering Rack Disturbance Force Estimation Using Estimated Longitudinal Tyre Force Imbalance → Disturbance Rejection Torque Demand → Disturbance Rejection Torque Demand

FIG.6.

Later Acceleration, Yaw Rate, Vehicle Speed, Steer Angle → Undisturbed Steering Rack Force Estimation → Steering Rack Disturbance Force Estimation → Disturbance Rejection Torque Demand → Disturbance Rejection Torque Demand

FIG.8.

Lateral Acceleration, Yaw Rate, Vehicle Speed, Steer Angle → Undisturbed Steering Rack Force Estimation → $\hat{F}_{rk}$ → (+/−, with Measured $F_{rk}$) → $\hat{F}_{dist}$ → Disturbance Rejection Torque Demand → Disturbance Rejection Torque Demand

RACK FORCE DISTURBANCE REJECTION

CROSS-REFERENCE TO RELATED APPLICATIONS

This application is a continuation of International Application No. PCT/GB2004/001356, filed Mar. 31, 2004, the disclosures of which are incorporated herein by reference, and which claims priority to Great Britain Patent Application No. 0308133.8 filed Apr. 9, 2003, the disclosures of which are incorporated herein by reference.

BACKGROUND OF THE INVENTION

The present invention relates to the steering of automobiles.

Variation in road surface friction and profile, asymmetric brake torque and differential acceleration of the front wheels cause disturbances in the longitudinal tyre forces, lateral tyre forces, tyre self-aligning moment and suspension deflection forces. These disturbances are fed to the driver by the steering column affecting subjective evaluation, and in the worst case vehicle instability.

The lateral force on a vehicle's steering rack is a function of the sum of the moments about its left and right kingpin axes. Kingpin moments are generated by longitudinal and lateral tyre forces, suspension deflection forces and tyre self-aligning moments. The force in the steering rack is transmitted to the driver by the steering column.

There is a combination of mean longitudinal and lateral tyre forces, suspension deflection and tyre self-aligning moments with which a vehicle can follow a desired path. However the actual forces and moments fluctuate about the mean values due to road surface friction and profile variation, and asymmetric brake torque applications. This fluctuation can be considered to be a disturbance force applied to the steering system.

Disturbance forces in the steering system will be transmitted to the driver through the steering column, potentially adversely affecting the subjective evaluation of a vehicle. Unexpected disturbances can also dangerously affect the vehicle's stability. Designing steering and suspension geometry with the constraint to minimise the transmission of such disturbances may lead to compromises in other aspects of their design.

Thus it is desirable to be able to substantially reduce such disturbance forces through other means.

Increasing numbers of vehicles are now being fitted with Vehicle Stability Control (VSC) and Electric Power Steering (EPS) systems. VSC regulates a vehicle's motion at the limits of lateral traction through asymmetric brake activation. Its control relies on measured or estimated signals such as yaw rate, lateral acceleration, engine torque, steering angle, vehicle speed, brake pressures and wheel speeds. EPS aids a driver to steer a vehicle by applying a torque to its steering system. It is capable of applying a torque independent of the driver's steering input, although if it is to aid the driver the two are generally linked. EPS uses measured or estimated signals such as steering column angle, velocity and torque, steering rack force and vehicle speed.

BRIEF SUMMARY OF THE INVENTION

In accordance with the present invention there is provided a road vehicle steering system which is adapted to use measurements and estimates characterising the motion of and forces acting on the vehicle and the steering system such as to derive an estimate of steering system disturbance force and to then use the latter estimate to establish a torque demand for the vehicle power steering (EPS) which substantially compensates for this disturbance force.

One preferred embodiment uses an estimate of steering system disturbance force based upon estimated longitudinal tyre force imbalance between the front left and right steered wheels.

The imbalance in the longitudinal tyre forces acting on the steered wheels can be assessed using measurements of vehicle engine torque, braking pressures and wheel speeds.

Advantageously, the estimate of longitudinal tyre force imbalance ($\Delta \hat{F}_{xf}$) is derived using the equation:

$$\Delta \hat{F}_{xf} = \hat{F}_{xfl} - \hat{F}_{xfr} = \frac{1}{R}\left[\left(\frac{\hat{T}_{gb}}{2} - \hat{T}_{bfl} - J_w \omega'_{fl}\right) - \left(\frac{\hat{T}_{gb}}{2} - \hat{T}_{bfr} - J_w \omega'_{fr}\right)\right]$$

$\Delta \hat{F}_{xf}$=difference in estimated longitudinal tyre force on the left and right front tyres.

$\hat{F}_{xfl}$=estimated longitudinal tyre force on left front tyre $\hat{F}_{xfr}$=estimated longitudinal tyre force on right front tyre $\hat{T}_{gb}$=calculated torque output from vehicle gearbox $\hat{T}_{bfl}$=brake torque on left front wheel $\hat{T}_{bfr}$=brake torque on right front wheel $J_w$=rotational inertia of wheels $W'_{fl}$=angular velocity of left front wheel $W'_{fr}$=angular velocity of right front wheel R=wheel radius.

Another embodiment uses an estimate of steering system disturbance based upon estimated undisturbed steering rack force in order to establish said compensating torque demand.

Advantageously an expected force on a steering rack with the steering system is estimated when an idealised, undisturbed vehicle undergoes measured motion characteristics of the actual vehicle containing said steering system and a calculation is then made of the disturbance force on the steering rack and a torque demand for the EPS to counteract that disturbance force.

In some embodiments, the disturbance force can be calculated using a measurement of the total force on the steering rack.

Advantageously, the total force on the steering rack is estimated based just on an estimation of the lateral force at the front axle.

By making certain simplifying assumptions, the estimation ($\hat{F}_{yf}$) of the lateral force at the front axle can be calculated using:

$$\hat{F}_{yf} = \frac{bmrU}{a+b}$$

where a=distance from front axle to vehicle centre of gravity b=distance from rear axle to vehicle centre of gravity m=vehicle mass r=yaw rate of vehicle U=speed of vehicle.

In another embodiment, the lateral force at the front axle can be calculated using $$\hat{F}_{yf} = \frac{mbA_y + I'_r}{a+b}$$

where a=distance from front axle to vehicle centre of gravity
b=distance from rear axle to vehicle centre of gravity
$A_y$=lateral acceleration of vehicle
I=yaw inertia of vehicle
r'=yaw acceleration of vehicle.

In yet another embodiment, the estimate ($\hat{F}_{yf}$) of the lateral force at the front axle can be calculated using a bicycle model in an observer of the lateral force.

Advantageously, the bicycle model is provided with two input signals, one being an estimate of the steer angle of the front wheels and the other being a scaled error between the lateral acceleration and/or yaw rate measured on the vehicle and those predicted by the bicycle model.

In the aforegoing embodiments, undisturbed steering rack force ($\hat{F}_{rk}$) can be established from the estimated total kingpin movement $\hat{M}_{kp}$ $$\hat{M}_{kp} = l_3\hat{F}_{yf} + \hat{M}_{zf} = \left(l_3 + \frac{C_{mzf}}{C_f}\right)\hat{F}_{yf}$$

where $l_3$=caster offset
$\hat{F}_{yf}$=estimated lateral force at front axle
$\hat{M}_{zf}$=estimated self-aligning moment at the front axle
$C_{mzf}$=self-aligning moment coefficient
$C_f$=lateral tyre force.

In this case, estimated steering rack force ($\hat{F}_{rk}$) can be established from $$\hat{F}_{rk} = \frac{\hat{M}_{kp}}{l_2}$$

where $l_2$ is perpendicular distance from steering rack to kingpin axis.

In still further embodiments, disturbance force is calculated using a steering column observer in which a model of the steering column is fed with measurements and estimates of the driving torques and steering rack load, the model's prediction of the steering column motion then being compared with that measured in the vehicle and the error is fed into a model of the disturbance force behaviour and back into the steering column model itself.

Advantageously, the steering rack disturbance force ($F_{dist}$) is improved by combining with the estimate of steering rack disturbance force obtained via the steering column observer an estimate of steering force disturbance based upon estimated longitudinal tyre force imbalance.

In all cases, said measurements and estimates characterising the motion of end forces acting on the vehicle preferably comprise signals available from existing Vehicle Stability Control (VSC) and Electric Power Steering (EPS) systems in the vehicle.

Other advantages of this invention will become apparent to those skilled in the art from the following detailed description of the preferred embodiments, which read in light of the accompanying drawings.

BRIEF DESCRIPTION OF THE DRAWINGS

FIG. 1 shows the basic architecture of a system in accordance with the present invention;
FIG. 2 shows the structure of a control algorithm for a first embodiment;
FIG. 6 shows the structure of a control algorithm for a second embodiment;
FIG. 8 shows the structure of a control algorithm for a third embodiment.

DETAILED DESCRIPTION OF THE INVENTION

It is a feature of preferred embodiments of the present invention that use is made of signals commonly available with Vehicle Stability Control (VSC) and Electric Power Steering (EPS) systems for the purpose of estimating the total disturbance force. A set of measured or estimated signals from VSC and EPS can be used to estimate the steering system disturbance force. Use is made of a control algorithm that estimates steering system disturbance force using these measurements and estimates characterising the motion of and forces acting on the vehicle and steering system. The EPS can then be used to substantially reduce the transmission of the disturbance force to the driver by applying a counteracting compensating torque. The steering feel and vehicle safety of the steering system will then be improved and compromises in the design of steering and suspension geometry can be avoided.

The architecture of the control algorithm splits the task of the disturbance rejection controller into two steps. As shown in FIG. 1, a first step is to estimate the disturbance force on the steering rack and a second step is to command a torque to substantially compensate for the disturbance force.

Two embodiments of the control algorithm for estimating the disturbance force on the steering rack will be described hereinafter.

The first embodiment of the control algorithm uses measurements or estimates of the engine torque, brake pressures and wheel speeds to estimate the disturbance due to longitudinal tyre force imbalance (see FIG. 2).

Figure 3:
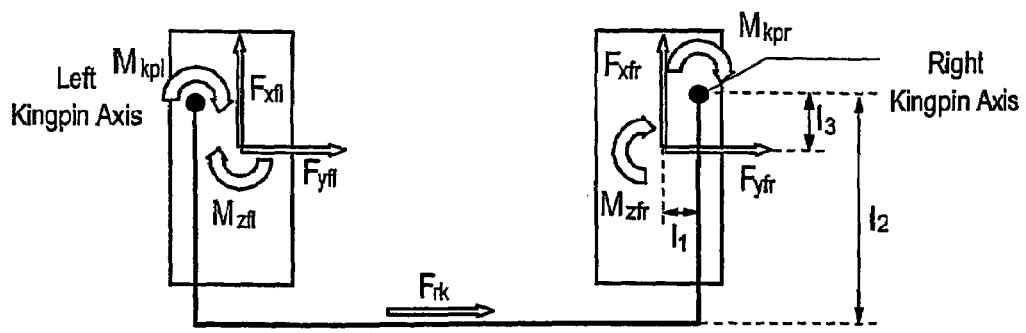
FIG. 3 shows the steering geometry and some of the forces and moments present in an automobile.

Steering geometry design commonly has the lines of action of the tyres' longitudinal forces placed so that the forces create a moment about the kingpin axis (see FIG. 3). As the geometry is symmetrical about the longitudinal axis of the vehicle, equal longitudinal forces cause equal and opposite kingpin moments (i.e. they are balanced). Any imbalance in the longitudinal forces will cause an imbalance in the left and right kingpin moments and result in a force which will be passed on to the driver via the steering rack.

In a FWD or 4WD vehicle the differential splits the engine torque equally between the left and right front wheels. There will be no longitudinal front tyre force imbalance if this equality of drive torque is combined with both wheels having constant angular velocities and equal rolling resistance. In this situation the vehicle can be considered to be in steady state. However an imbalance can exist when there are transient effects such as variation in road surface friction and profile, asymmetric brake torques and differential acceleration of the front wheels.

The transient effects of road surface friction and profile variation and asymmetric brake torques are considered to be disturbances. To a first order approximation it can be assumed that any imbalance in longitudinal tyre forces is due to a disturbance. This embodiment estimates the imbalance of longitudinal tyre forces in order to derive the resulting steering rack disturbance force.

Figure 4:
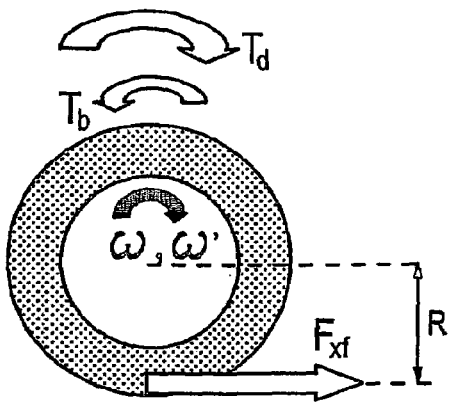
FIG. 4 shows a wheel with some of the torques and forces present.

Any imbalance in longitudinal tyre forces can be estimated using engine torque estimates, brake pressure measurements or estimates and wheel speed measurements. Some torques and forces which act on the front wheel of a FWD or 4WD automobile are shown in FIG. 4.

Summing the torques on the wheel produces equation 1, where R and $J_w$ denote the rolling radius and rotational inertia properties of the wheel respectively. The front wheel drive torque ($T_d$) of a RWD vehicle would clearly equal zero.

$$T_d - T_b - F_{xf} R = J_w \omega \quad (1)$$

The estimates of the drive torques acting on the left and right wheels ($\hat{T}_{dl}$, and $\hat{T}_{dr}$) are derived by dividing the estimated torque output from the gearbox ($\hat{T}_{gb}$) equally between them. The estimated torque output from the gearbox ($\hat{T}_{gb}$) is calculated from the engine management system's estimate of engine torque and knowledge of the gear ratio.

Estimated brake torque ($\hat{T}_b$) can be considered to be proportional to estimated brake pressure (equation 2, where $k_b$, is the constant of proportionality). Hence the brake torque at each wheel can be derived from its measured ($P_b$) or estimated brake pressure ($\hat{P}_b$). The brake torque estimate can be determined from a VSC system, for example.

$$\hat{T}_b = \hat{K}_b P_b \quad (2)$$

The wheel's rotational acceleration ($\omega'$) can be calculated by numerically differentiating the wheel speed signal $\omega$, which can be measured independently by the ABS, Traction Control and VSC systems.

The estimate of the longitudinal tyre force imbalance ($\Delta \hat{F}_{xf}$) is given in equation 3. The net kingpin moment due to this imbalance ($\hat{M}_{kp\text{-}long}$) is given by equation 4 in which $1_1$ is the perpendicular distance between the line of action of the longitudinal tyre force and the point about which the tyre pivots, hereinafter referred to as the kingpin offset or scrub radius (see FIG. 3). $1_1$ can be a negative value (eg for a negative kingpin offset, where the line of action of the longitudinal force is inside the kingpin axis).

$$\hat{F}_{xf} = \hat{F}_{xfl} - \hat{F}_{xfr} = R^{-1}\{(\tfrac{1}{2}\hat{T}_{gb} - \hat{T}_{bfl} J\omega_{fl}) - (\tfrac{1}{2}\hat{T}_{gb} - \hat{T}_{bfr} - J_\omega \omega^1_{fr})\} \quad (3)$$

$$\hat{M}_{kp\text{-}long} = 1_1 \Delta \hat{F}_{xf} \quad (4)$$

The estimate of the steering rack disturbance force is proportional to $\hat{M}_{kp\text{-}long}$ (equation 5), with the constant of proportionality $1/1_2$, which is the inverse of the perpendicular distance from the rack to the kingpin axis as shown in FIG. 3.

$$\hat{F}_{dist\text{-}long} = \frac{\hat{M}_{kp\text{-}long}}{1_2} \quad (5)$$

The second embodiment of the control algorithm has three stages (as shown in FIG. 6). It initially estimates the force on the steering rack expected when an idealised, undisturbed vehicle undergoes the actual measured motion of the vehicle (for example its speed yaw rate, lateral acceleration and steer angle). It then calculates the disturbance force on the steering rack using either a measurement of the total force on the rack or an observer of the motion of the steering column using measurements of steering wheel torque, assistance torque and steering column angular velocity. The control algorithm then manipulates the steering rack disturbance force estimate into a demand torque to compensate substantially for the disturbance.

The first embodiment only considers the effect of longitudinal tyre force disturbances. As previously stated, variation in tyre lateral forces and self-aligning moments and suspension deflection forces can also induce disturbances in the steering rack. The first embodiment therefore only considers a subset of the total number of disturbances that can act.

If the entire set is to be considered a different approach must be taken. The first embodiment assumes that the force on the steering rack should always equal zero, because to a first approximation it can only be non-zero when the left and right longitudinal tyre forces are unbalanced, and this situation only occurs when a disturbance is acting. However during cornering, and in their undisturbed state, the left and right lateral tyre forces and self-aligning moments will cause kingpin moments which reinforce each other to apply an "undisturbed" force on the steering rack. Hence the second embodiment first predicts the undisturbed force on the steering rack before estimating the disturbance force superimposed upon it.

The first stage of the second embodiment estimates the force on the steering rack of an idealised vehicle undergoing the same motion as the actual vehicle. When travelling in a straight line the steering rack force of the actual vehicle will be near zero as the left and right kingpin moments, due to the longitudinal tyre forces, will be equal and opposite. When travelling round a bend, the left and right kingpin moments, due to the presence of lateral front tyre forces, suspension deflection forces and tyre self-aligning moments, will reinforce each other. Hence the steering rack force of the automobile will be non-zero.

When an automobile corners the balance of forces and moments about the kingpin axes is highly complex. In identifying these forces and moments, various factors including the non-linear variation of longitudinal and lateral tyre force and tyre self-aligning moment, lateral load transfer, the vehicle's roll dynamics and the brake torque distribution would have to be considered. The analysis of the forces and moments contributing to the steering rack force can be significantly simplified if the actual vehicle is idealised by a number of assumptions.

The assumptions that lateral load transfer does not occur and that road surface profile is uniform imply that suspension deflection forces are negligible. In addition by assuming road surface friction and brake torques to be uniform, then the lateral forces and self-aligning moments of the left and right hand tyres are equal. Any longitudinal force imbalance occurring independently of these assumptions can be considered to be negligible. Hence only the lateral forces and self-aligning moments of the tyres affect the undisturbed steering rack force, and since they are equal left and right, their total at the front axle need only be considered henceforward.

The estimation of the total kingpin moment is further simplified if it is assumed firstly that lateral tyre forces are independent of the longitudinal forces, and second that both lateral tyre forces and tyre self-aligning moments vary linearly with slip angle. Then it is shown below that by eliminating, the self-aligning moment at the front axle ($M_{zf}$) is a function of the lateral force at the front axle ($F_{yf}$) only (equation 8). $C_f$ and $C_{mzf}$ denote the lateral tyre force and self-aligning moments coefficients of the axle, respectively. Under these assumptions the force on the steering rack is a function of the lateral force at the front axle only.

$$F_{yf} = C_f \alpha_f \qquad (6)$$

$$M_{zf} = \alpha_f C_{Mzf} \qquad (7)$$

$$M_{zf} = \frac{C_{Mzf} F_{yf}}{C_f} \qquad (8)$$

There are a number of methods available to estimate the lateral force at the front axle. Three are outlined here. The first two are based on a simple model of the lateral forces and their moments acting on the vehicle, while the third is based on the well-known, so-called "bicycle model".

The simplest method uses the measured yaw rate and vehicle speed, assuming the motion of the vehicle to be steady state. A more accurate approximation accepts it to be dynamic and additionally involves the measured lateral acceleration. The best approach uses both these signals and the measured steer angle within an observer structured about the bicycle model.

The lateral and yaw rate motion of the vehicle can be modelled simply using Newton's second law. Summing the lateral forces at the front and rear axles ($F_{yf}$ and $F_{yr}$ respectively) determines equation 9 in which m denotes the mass of the vehicle and Ay its lateral acceleration. Summing the moments due to these forces about the centre of gravity specifies equation 10, where a, b, I and r' denote the perpendicular distance from the front axle to the centre of gravity, the perpendicular distance from the rear axle to the centre of gravity, the yaw inertia of the vehicle and its yaw acceleration, respectively.

$$F_{yf} + F_{yr} = mAy \qquad (9)$$

$$aF_{yf} - bF_{yr} = Ir' \qquad (10)$$

These equations are formed under five assumptions:
i. all external forces acting on the vehicle, such as gravity and aerodynamic resistance, are considered to be negligible;
ii. the longitudinal tyre force is defined to be symmetrical about the longitudinal axis of the vehicle so that it has no effect on the yaw moment of the vehicle;
iii. the self-aligning moments of the tyre are assumed to be negligible;
iv. the front axle lateral force is considered to act perpendicularly to the longitudinal axis of the vehicle when it in fact acts perpendicularly to the front tyres which are steered at an angle to this axis; and
v. the coupling of the lateral and yaw motion into the longitudinal, bounce, pitch and roll degrees of freedom is assumed to be negligible.

Under the assumption that vehicle motion occurs in the longitudinal and lateral directions and about the yaw axis only, then the lateral acceleration of a vehicle can be shown to be a function of its yaw rate, longitudinal velocity and the differential of its lateral velocity (v') as shown in equation 11. In the steady state, the lateral velocity and yaw rate differentials equal zero. Hence by substituting equation 11 into equation 9 and eliminating v' and r' in equations 10 and 12, the lateral force at the front axle can be estimated as in equation 15.

$$Ay = v' + rU \qquad (11)$$

$$F_{yf} + F_{yr} = m(v' + rU) \qquad (12)$$

$$F_{yf} + F_{yr} = mrU \quad \text{(In a Steady State)} \qquad (13)$$

$$aF_{yf} - bF_{yr} = 0 \quad \text{(In a Steady State)} \qquad (14)$$

$$\hat{F}_{yf} = \frac{bmrU}{a+b} \qquad (15)$$

The accurate range of this estimate of $F_{yf}$ will be limited due to its assumption of steady state manoeuvring, the fundamental errors in the measurements of yaw rate and vehicle speed and the continuous variation in m, a and b. Due to the subjective nature of the effect of the invention, its accuracy may prove to be sufficient.

If dynamic manoeuvres are considered, v' and r' are non-zero and hence equations 9 and 10 can be directly rearranged to give equation 16.

$$F_{yf} = \frac{mbA_y + I'_r}{a+b} \qquad (16)$$

This approximation to $F_{yf}$ requires an r' signal which is not measured on the vehicle. The act of differentiating signals magnifies their noise component at the expense of their rate of change. Hence the accuracy of this method of estimating the front axle tyre force is limited by the noise induced by differentiation (measures can be taken to reduce it), along with the measurement errors and parameter variation effect mentioned above. Again due to the subjective nature of the effect of the invention, the accuracy of this method may prove sufficient.

There is an alternative method of estimating $F_{yf}$ that avoids noise corruption, and considers both steady state and dynamic manoeuvring scenarios. This method is to use a bicycle model in an observer of $F_{yf}$ as shown in FIG. 7.

A "bicycle model" is a simplified model of an automobile. The model assumes that there are two wheels instead of four, that the front wheel is for steering, and that the centre of mass is located between the two wheels.

When part of the observer, the bicycle model is fed with two signals, the first being the estimated steer angle of the front wheels and the second is the scaled error between the lateral acceleration and/or yaw rate measured on the vehicle and those predicted by the bicycle model. This feedback improves the bicycle model's prediction. The steer angle estimate δ is simply derived by dividing the measured steering column angle by the steering ratio. The estimate of the lateral force at the front axle is calculated within the bicycle model from its state.

Figure 7:
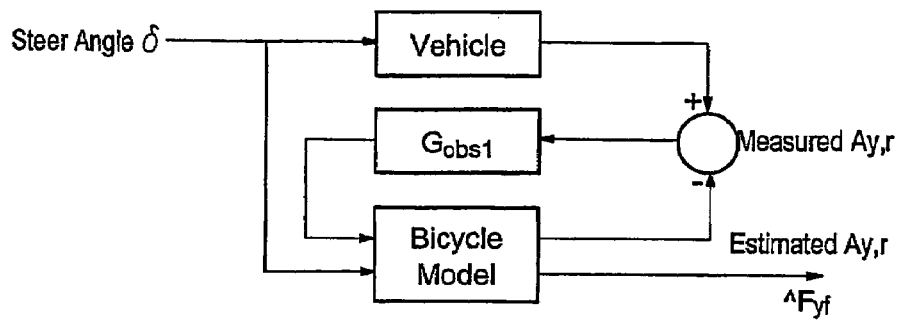
FIG. 7 shows the $F_{yf}$ observer structure.

Referring to FIG. 7 which derives the $F_{yf}$ observer, the block marked "vehicle" symbolises the actual dynamics of the vehicle in that its outputs, the measured lateral acceleration and/or yaw rate are dependent upon its steer angle input.

The block marked "bicycle model" contains a bicycle model fitted with parameters specific to the "vehicle" block. Its inputs are the estimated steer angle and the signal from the block $G_{obs1}$, described hereinafter. The states of the bicycle model are estimates of the lateral velocity of the vehicle and yaw rate, from which it calculates its three-outputs—estimates of the lateral acceleration, yaw rate and the front axle lateral force.

The block marked $G_{obs1}$ is a matrix gain scaling the error between the measured and bicycle model predicted lateral acceleration and yaw rate. Another embodiment could consider lateral acceleration and yaw rate individually. Values of $G_{obs1}$ determine the position of the poles of the observer and hence its speed in tracking the state of the vehicle, and is selected to make the observer poles faster than those of the bicycle model it is based on.

Under the previous assumptions, the steering rack force estimate is a function of the estimate of the lateral force at the front axle ($\hat{F}_{yf}$) only. Knowledge of the steering geometry of the vehicle enables the total kingpin moment ($\hat{M}_{kp}$) to be estimated from $\hat{F}_{yf}$ (equation 17), and then enables the undisturbed steering rack force to be estimated from $\hat{M}_{kp}$ (equation 18).

The line of action of the lateral forces of the front tyres is often set-back from the kingpin axes by the distance known as the caster offset ($l_3$) in FIG. 3. The lateral forces of the tyre therefore generate moments about each kingpin axis to complement the effect of their self-aligning moments. The sum of the moments acting around the kingpin axes is given in equation 17.

$$\hat{M}_{kp} = l_3 \hat{F}_{yf} + \hat{M}_{zf} = \left(l_3 + \frac{C_{mzf}}{C_f}\right)\hat{F}_{yf} \tag{17}$$

As in equation 5, the estimate of the force in the steering rack can be inferred from the above estimates of the kingpin axis moment.

$$\hat{F}_{rk} = \frac{\hat{M}_{kp}}{l_2} \tag{18}$$

The models of the kingpin moment and the steering rack force given by equations 17 and 18 are both first order approximations. For example, the estimate of the total kingpin moment could be improved by consideration of the kingpin and caster angles. Additional improvements could be achieved by progressively removing each assumption described above, starting with the linear relationship of lateral tyre force and self-aligning moment to slip angle.

As stated hereinbefore the force in the steering rack ($F_{rk}$) is made up of two components. The fundamental undisturbed component is the value that equation 18 estimates. Superimposed on the fundamental is the disturbance force ($F_{dist}$) which is continuously fluctuating due to the variation of surface friction and profile, and wheel torques.

The two methods identified above to estimate the steering rack disturbance force due to variation of longitudinal and lateral tyre forces, suspension deflection forces and tyre self-aligning moments are now described. Both make use of the estimate of the fundamental, undisturbed, steering rack force derived earlier. The first method uses a measurement of the steering rack force to estimate $F_{dist}$. The second method utilises a steering system observer to infer the disturbance force from the steering column motion.

$F_{dist}$ can be estimated by subtracting the expected rack force $\hat{F}_{rk}$, from a measurement of the actual rack force $F_{rk}$ as shown in FIG. 8. The result is considered to be an estimate of $F_{dist}$ because of the assumptions used to generate $\hat{F}_{rk}$.

These oversimplify the dynamics of the vehicle in the process of eliminating the effects of road surface property and applied torque variation.

The second method uses a steering column observer to infer the disturbance force. The principle of this method is to feed a model of the steering column with measurements and estimates of its inputs, the driving torques and steering rack load, the latter including the estimate of $F_{dist}$. The model's prediction of the steering column motion is then compared with that measured on the vehicle and the error is fed into a model of the disturbance force behaviour and back into the steering column model itself. This feedback improves the model's tracking. The structure of the method is shown in FIG. 9.

The block marked "steering column" in FIG. 7 represents the dynamics of the actual steering system which produce the measured output and the steering column angular velocity, as a result of the measured and unknown inputs. The measured inputs are the torque applied by the driver to the steering wheel, and the assistance torque. The unknown input is the total force in the steering rack.

Figure 9:
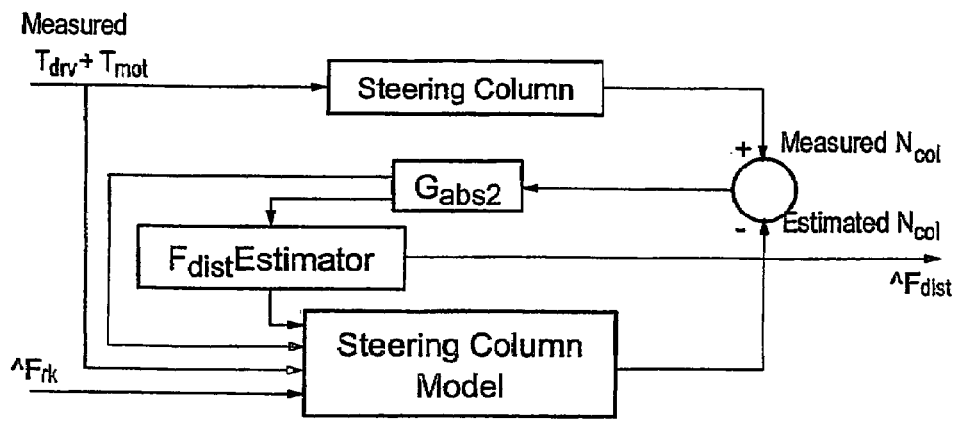
FIG. 9 shows the steering column observer structure.

The steering column model in FIG. 9 represents the dynamics from the steering wheel to the steering rack, with power assistance provided by an electric motor (of an EPS system). The inertia ($J_s$) and damping ($L_s$) of the entire system is lumped onto the column, and its friction and compliance are ignored. The model with its inputs is pictured in FIG. 9.

Figure 5:
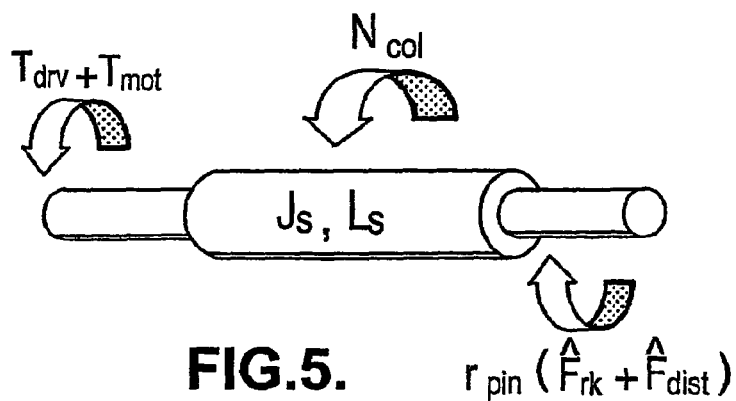
FIG. 5 is a schematic representation of a steering system.
Figure 11:
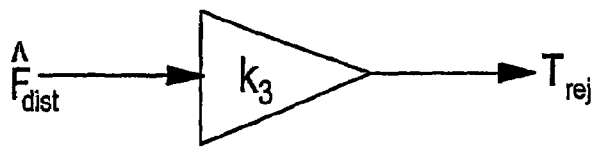
FIG. 11 shows how the disturbance rejection torque is proportional to disturbance force estimate.

Referring now to FIG. 5, summing the torques acting about the steering column generates its equation of motion as shown by equation 19, where $N_{col}$, $N_{col}'$, $T_{drv}$, $T_{mot}$, $\hat{F}_{rk}$, $\hat{F}_{dist}$ and $r_{pin}$ denote the steering electric motor, estimated steering rack force, estimated disturbance steering rack force and the radius of the pinion gear acting on the steering rack respectively.

$$J_s N'_{col} + L_s N_{col} = T_{drv} + T_{mot} - r_{pin}(\hat{F}_{rk} + \hat{F}_{dist}) \tag{19}$$

The "$F_{dist}$ Estimator" block of FIG. 9 estimates the value of the steering rack disturbance force. It assumes behaviour of the force to have second order dynamics (given in equation 20) such that the estimate of $F_{dist}$ is calculated from $F_{dist}'$ and $F_{dist}''$ inputs. The constants $K_1$ and $K_2$ determine the rate of response and damping of the estimate.

$$\hat{F}_{dist} = \frac{K_1 \hat{F}'_{dist}}{K_2} - \frac{\hat{F}''_{dist}}{K_2} \tag{20}$$

The block marked "$G_{obs2}$" in FIG. 9 is a matrix gain scaling the error between the measured and predicted steering column angular velocities. $G_{obs2}$'s values determine the position of the poles of the observer and hence its speed in tracking the steering column and steering rack disturbance force, and is selected to make the observer poles faster than those of the steering column model it is based upon.

Figure 10:
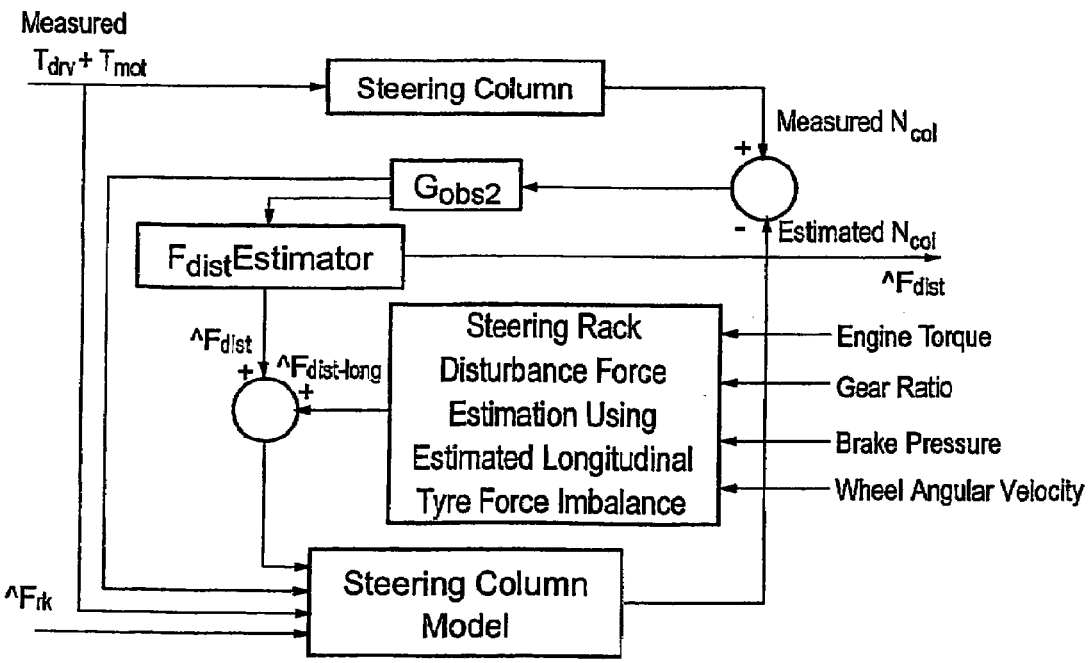
FIG. 10 shows a structure which combines a steering column observer and a longitudinal tyre force imbalance estimator.

As shown in FIG. 10, the steering rack disturbance force due to longitudinal tyre force imbalance derived as described hereinbefore can be combined with the steering column observer to improve the estimate of $F_{dist}$. By summing the estimate of the disturbance force due to longitudinal tyre force imbalance ($\hat{F}_{dist-long}$) with the steering column observer's $F_{dist}$ estimate, the role of the estimator is reduced. It will then estimate the disturbance force due to variation in lateral tyre force suspension deflection force and tyre self-aligning moment and not longitudinal tyre force imbalance. This summation and its place in the steering column observer's structure is shown in FIG. 10.

The disturbance rejection torque ($T_{rej}$) is in this embodiment proportional to $\hat{F}_{dist}$ by the gain $K_3$, as shown in FIG.

11. The torque demand to the EPS motor ($T_{rej}$) will be superimposed on its assistance torque ($T_{mot}$).

In accordance with the provisions of the patent statutes, the principle and mode of operation of this invention have been explained and illustrated in its present embodiment. However, it must be understood that this invention may be practiced otherwise than as specifically explained and illustrated without departing from itsi spirit or scope.

The invention claimed is:

1. A road vehicle steering system comprising a controller structured and configured to receive and use signals from one of a vehicle stability control (VSC) system and a vehicle electric power steering (EPS) system, said signals defining measurements and estimates of the motion of, and forces acting on, a vehicle and a steering system,
    wherein a control algorithm uses said signals to derive an estimate of steering system disturbance force,
    wherein said estimate of steering system disturbance force is used to establish a torque demand for said vehicle EPS system which substantially compensates for said disturbance force, and
    wherein, said controller is further structured and configured to estimate an expected force on a steering rack within said vehicle steering system when an undisturbed vehicle undergoes an actual measured motion of said vehicle, said estimate of the expected force on said steering rack used to estimate the steering system disturbance force.

2. A steering system as claimed in claim 1, which uses an estimate of steering system disturbance based upon estimated undisturbed steering rack force in order to establish said compensating torque demand.

3. A steering system as claimed in claim 2, wherein undisturbed steering rack force ($\hat{M}_{kp}$) is established from $$\hat{M}_{kp} = l_3 \hat{F}_{yf} + \hat{M}_{zf}$$

$$= \left(l_3 + \frac{C_{mzf}}{C_f}\right)\hat{F}_{yf}$$

where $l_3$=caster offset
$F_{yf}$=estimated lateral force at front axle
$M_{zf}$=total kingpin movement
$c_{mzf}$=self alinging moment coefficient
$C_f$=lateral tire force coefficient.

4. A steering system as claimed in claim 3, wherein estimated steering rack force ($\hat{F}_{rk}$) is established from $$\hat{F}_{rk} = \frac{\hat{M}_{kp}}{l_2}$$

where $l_2$=perpendicular distance from steering rack to kingpin axis.

5. A steering system as claimed in claim 1, wherein the disturbance force is calculated using a measurement of the total force on the steering rack.

6. A steering system as claimed in claim 1, wherein the total force on the steering rack is estimated based just on an estimation of the lateral force at the front axle.

7. A steering system as claimed in claim 1, wherein an estimate ($\hat{F}_{yf}$) of the lateral force at the front axle can be calculated using a bicycle model in an observer of the lateral force, and wherein the estimate ($F_{yf}$) of the lateral force at the front axle is calculated using:

$$\hat{F}_{yf} = \frac{mbA_y + Ir'}{a+b}$$

where a=distance from front axle to vehicle centre of gravity
    b=distance from rear axle to vehicle centre of gravity
    $A_y$=lateral acceleration of vehicle
    I=yaw inertia of vehicle
    r'=yaw acceleration of vehicle.

8. A steering system as claimed in claim 7, wherein the bicycle model is provided with two input signals, one being an estimate of the steer angle of the front wheels and the other being a scaled error between the lateral acceleration and/or yaw rate measured on the vehicle and those predicted by the bicycle model.

* * * * *